(12) United States Patent
Chang

(10) Patent No.: US 9,206,943 B2
(45) Date of Patent: Dec. 8, 2015

(54) EXTENSION ROD DEVICE WORKING WITH FIXER FOR HANDHELD, PORTABLE, MOBILE DEVICES

(71) Applicant: Michael Chau-Lun Chang, Taipei (TW)

(72) Inventor: Michael Chau-Lun Chang, Taipei (TW)

(*) Notice: Subject to any disclaimer, the term of this patent is extended or adjusted under 35 U.S.C. 154(b) by 0 days.

(21) Appl. No.: 14/731,418

(22) Filed: Jun. 5, 2015

(65) Prior Publication Data

US 2015/0267863 A1    Sep. 24, 2015

Related U.S. Application Data

(63) Continuation-in-part of application No. 13/657,878, filed on Oct. 23, 2012, now abandoned.

(51) Int. Cl.
| | |
|---|---|
| F16B 2/10 | (2006.01) |
| F16M 13/02 | (2006.01) |
| A45F 5/00 | (2006.01) |
| A45B 1/00 | (2006.01) |
| F16M 11/28 | (2006.01) |
| F16B 2/12 | (2006.01) |

(52) U.S. Cl.
CPC ............... *F16M 13/022* (2013.01); *A45B 1/00* (2013.01); *A45F 5/00* (2013.01); *F16M 11/28* (2013.01); *F16B 2/12* (2013.01)

(58) Field of Classification Search
USPC ............. 248/351, 354.1, 354.3, 230.6, 230.5, 248/230.4, 231.71, 231.61, 231.51, 316.1, 248/316.5, 316.6; 269/3, 6, 95, 71
See application file for complete search history.

(56) References Cited

U.S. PATENT DOCUMENTS

| | | | |
|---|---|---|---|
| 2,019,789 A * | 11/1935 | Mahannah | 269/71 |
| 2,110,037 A * | 3/1938 | De Rosa | 248/104 |
| 2,725,210 A | 11/1955 | Swartz | |
| 2,726,694 A * | 12/1955 | Saxton | 269/218 |
| 4,193,173 A * | 3/1980 | Lorenz | 220/327 |
| 4,258,908 A * | 3/1981 | Goff et al. | 269/239 |
| 4,735,388 A * | 4/1988 | Marks | 248/103 |
| 4,799,639 A * | 1/1989 | Riley | 248/228.4 |
| 5,118,127 A | 6/1992 | Partington | |
| 5,288,093 A | 2/1994 | Gross | |
| 5,549,268 A | 8/1996 | Hopwood | |
| D394,669 S * | 5/1998 | Becker et al. | D16/242 |
| D464,250 S * | 10/2002 | Warner et al. | D8/355 |
| 6,893,012 B2 * | 5/2005 | Wong | 269/249 |
| 7,436,275 B2 * | 10/2008 | Dale | 333/255 |
| 8,226,062 B2 | 7/2012 | Yu et al. | |
| D670,284 S | 11/2012 | Choi | |
| 8,794,612 B2 * | 8/2014 | Chuang | 269/128 |
| 2008/0099645 A1 * | 5/2008 | Reichley | 248/285.1 |

\* cited by examiner

*Primary Examiner* — Alfred J Wujciak

(57) ABSTRACT

An extension rod device working with a fixer for handheld, portable, mobile devices, and includes a rod body whose two ends are detachably attached with a positioning frame and a securing member. The positioning frame is adjustable to hold a mobile device, and the securing member secures the rod body and the positioning frame onto an external article, so as to suspend the mobile device. The extension rod device is capable of being easily and quickly mounted on or dismounted from any nearby handrail. When the positioning frame and the securing member are detached from the two ends of the rod body, the rod body can function as a portable personal article.

9 Claims, 10 Drawing Sheets

EXTENSION ROD DEVICE WORKING WITH FIXER FOR HANDHELD, PORTABLE, MOBILE DEVICES

CROSS-REFERENCE TO RELATED APPLICATION

This application is a continuation-in-part of U.S. patent application Ser. No. 13/657,878 filed Oct. 23, 2012. The above application is incorporated by reference herein.

BACKGROUND OF THE INVENTION

1. Technical Field

The present invention relates to an extension rod device working with a fixer for handheld, portable, mobile devices. The fixer is portable and serves to suspend a mobile electronic device, such as a mobile phone, a portable game player, an electronic book, a GPS device or a tablet computer, and the extension rod device is designed to work with such a fixer.

2. Description of Related Art

Recently, handheld, mobile devices such as mobile phones and tablet computers have been popular, and nowadays almost everyone has one. While these mobile devices are relatively compact and light-weight, holding them in hand for a sustained time period is still a significant, accumulative burden to muscle, and this is particularly true for people lacking exercise.

There are some fixers designed for small-size mobile devices, but these fixers commonly fail to provide the advantages desired by users, such as being easy to mount and dismount, being compact and light, and being retractable, thereby being more portable.

The existing fixing tools for mobile devices are mainly using a flexible hose ended with a clamp that is configured to hold the whole tool on a table plate. While such an existing fixing tool is effective in suspending a mobile device over a table, it is structurally weak and tends to deform and come down after a long term of suspension. Also due to its weakness, for operating the mobile device, a user has to first use one hand support the mobile device from its back and then use the other hand to touch the touch screen. This causes the existing fixing tools to be unfavorable to mobile device operation.

Moreover, in the existing fixing tool, the clamp can only work well with a planar support. However, when leaving a house and used in a public transportation vehicle, such as a MRT train, a subway or a bus, where there are only vertical mop stick handrails, the fixing tool fails because its clamp cannot engage with the handrails effectively. The above-mentioned problems are for us to solve.

BRIEF SUMMARY OF THE INVENTION

The present invention provides an extension rod device working with a fixer that is portable and serves to hold and suspend a mobile electronic device, such as a mobile phone, a portable game player, an electronic book, a GPS device or a tablet computer. The primary objective of the present invention is to suspend a mobile device with proper overall rigidity, so that a user can operate the suspended mobile device by touching or sliding on its touch screen without displacing the mobile device from where it is positioned. Also, the disclosed fixer is configured to firmly grasp a smooth, vertical rod, so that a user riding a public transportation vehicle can conveniently suspend and use his/her mobile device in the vehicle, wherein the fixer supports the mobile device with proper overall rigidity, so that a user can operate the suspended mobile device by touching or sliding on its touch screen. Thereby, the present invention is helpful to prevent users' muscle fatigue and ache caused by overuse of neck and shoulder muscles.

To achieve the foregoing objective, the present invention provides an extension rod device working with a fixer for handheld, portable, mobile devices, the extension rod device comprising: a rod body having two ends that are detachably attached with a positioning frame and a securing member, respectively, the positioning frame serving to hold and position an external mobile device; a first connecting portion formed on the positioning frame for engaging a first linking portion, one end of the first linking portion connected to one end of the rod body; and a second connecting portion connected with the securing member for engaging a second linking portion that is connected to another end of the rod body; wherein the securing member comprises at least two movable clamping jaws and a threaded bolt 35, each of the clamping jaws having a clamping arm, a pivoting arm, a pivoting end formed at one end of the pivoting arm for being pivoted on the second connecting portion, and a pivot formed with a thread hole on the pivoting arm, the threaded bolt comprising an outer rod and an inner rod screwed to the outer rod, the outer rod having threads spiraling in a direction opposite to that of the inner rod, the outer rod and the inner rod respectively screwed to the pivots of the pivoting arms for adjusting an included angle between the clamping jaws, so as to secure or release the rod body and the positioning frame onto an external article.

In one aspect of the present invention, the positioning frame comprises a base and an extending board, the base forms a receiving space therein where a gearing portion is disposed therein, and the extending board comprises a track formed on and along the extending board, the track having a plurality of tooth portions for being engaged with the gearing portion, so that the extending board is engageably movable into and out of the receiving space for holding or releasing the external mobile device.

In another aspect of the present invention, the base further comprises at least a restraining apparatus disposed in the receiving space, the restraining apparatus comprising at least a depressed portion exposed to the base for being pressed, at least a restraining arm, and an elastic element connecting the depressed portion and the restraining arm, the restraining arm being engageable with the gearing portion and capable of being disengaged from the gearing portion by depressing the depressed portion.

In another aspect of the present invention, the rod body forms a hollow portion therein which penetrates one end of the rod body for receiving one end of the first linking portion, the first connecting portion forms a connecting hole thereon which comprises a plurality of tooth-like grooves radially extending outward from peripheries of the connecting hole, the first linking portion disposed in the hollow portion and comprising at least a first engaging leg and at least a second engaging leg respectively extending out of the hollow portion and spaced apart from the rod body, the at least a first engaging leg and a second engaging leg correspondingly passing through the plurality of tooth-like grooves of the connecting hole, so as to connect the rod body and the positioning frame and allow the positioning frame to be rotatable upon the first linking portion.

With the above-mentioned structure, the extension rod device can be rapidly secured to or detached from any nearby handrail or board-like object by means of the securing member, and the positioning frame is adjustable to hold and position the mobile device. The whole assembly is helpful to prevent users' muscle fatigue and ache caused by overuse of neck and shoulder muscles.

DETAILED DESCRIPTION OF THE INVENTION

Figure 1:
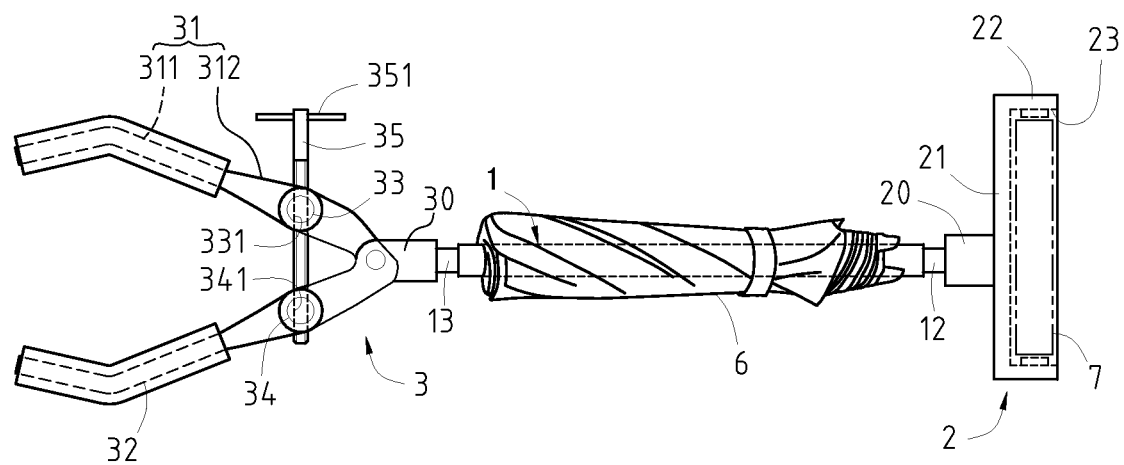
FIG. 1 is a front elevation view of one preferred embodiment of the present invention.

FIG. 1 through FIG. 13 depict preferred embodiments of the present invention. As shown, the disclosed extension rod device 100 working with a fixer for handheld, portable, mobile devices comprises a rod body 1, which has a round or polygonal cross-sectional shape. The rod body 1 has two ends detachably provided with a positioning frame 2 and a securing member 3 with the external fixer, respectively. The positioning frame serves to hold and position an external mobile electronic device 7, such as a mobile phone, a portable game player, an electronic book, a GPS device or a tablet computer. The securing member 3 serves to secure the rod body 1 and the positioning frame 2 to an external article, so as to suspend the mobile device 7 over the external article, which may be a planar or a bar-like object.

The rod body 1 has one of its ends provided with a first linking portion 12 for engaging with the positioning frame 2. The other end of the rod body 1 has a second linking portion 13 for engaging with the securing member 3. The rod body 1 is rigid in either a vertical direction or a horizontal direction. The second linking portion 13 is capable of being the same as the first linking portion 12 in shapes and structure.

The securing member 3 is configured to rapidly and firmly grasp the external article no matter it is a horizontal or vertical planar structure, a cylinder or a lengthwise rod, pole or bar-like support, so as to support the mobile device 7 for a user to operate. When operated by the user, the mobile device 7 is strongly positioned over the external article by the rod body 1, and is prevented from swinging and displacing.

Figure 2:
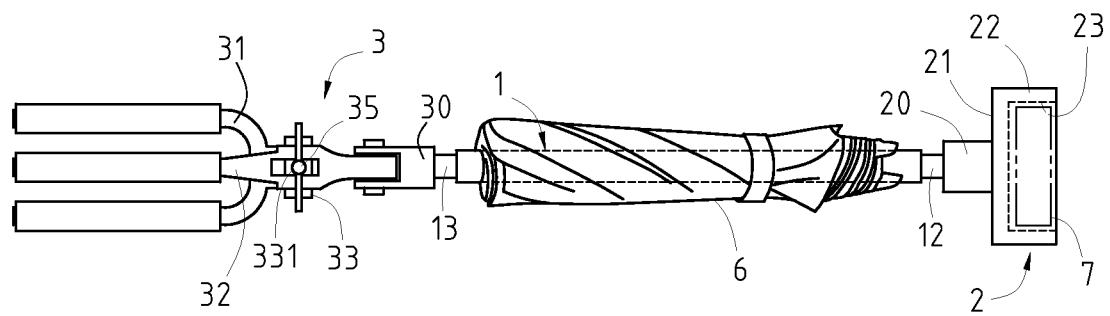
FIG. 2 is a top plan view of FIG. 1.
Figure 3:
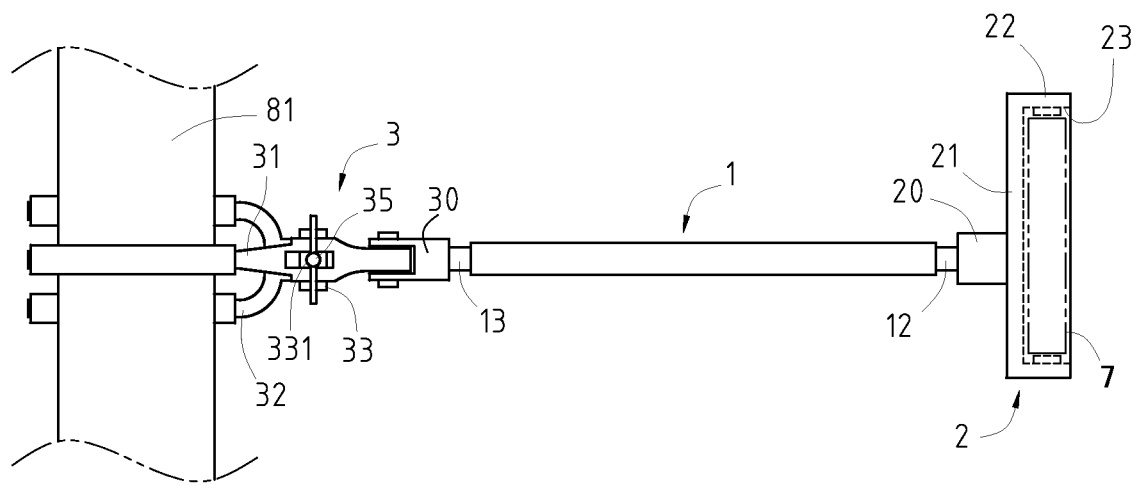
FIG. 3 is a schematic applied view of the present invention.

The rod body 1 may be an integral or telescopic pole-like portable personal article, which may be an umbrella, a crutch, a walking stick, a cane, a fishing pole, a pen, a microphone stand or a music stand, so that when the positioning frame 2 and the securing member 3 are detached from the two ends of the rod body 1, respectively. The rod body 1 serves to be used as the umbrella, the crutch, the walking stick, the cane, the fishing pole, the pen, the microphone stand or the music stand. In this case, the rod body 1, when acting as an umbrella, a crutch, a walking stick, a cane, a fishing pole, a pen, a microphone stand or a music stand, may have each of the second linking portion 13 and the first linking portion 12 at its two ends provided with a cap or a sheath for protecting the second linking portion 11 and the first linking portion 12. In the case where the rod body 1 can be used as an umbrella or a parasol (as shown in FIGS. 1 and 2), the rod body 1 supports an umbrella frame that is covered by a piece of umbrella cloth 6.

Figure 4:
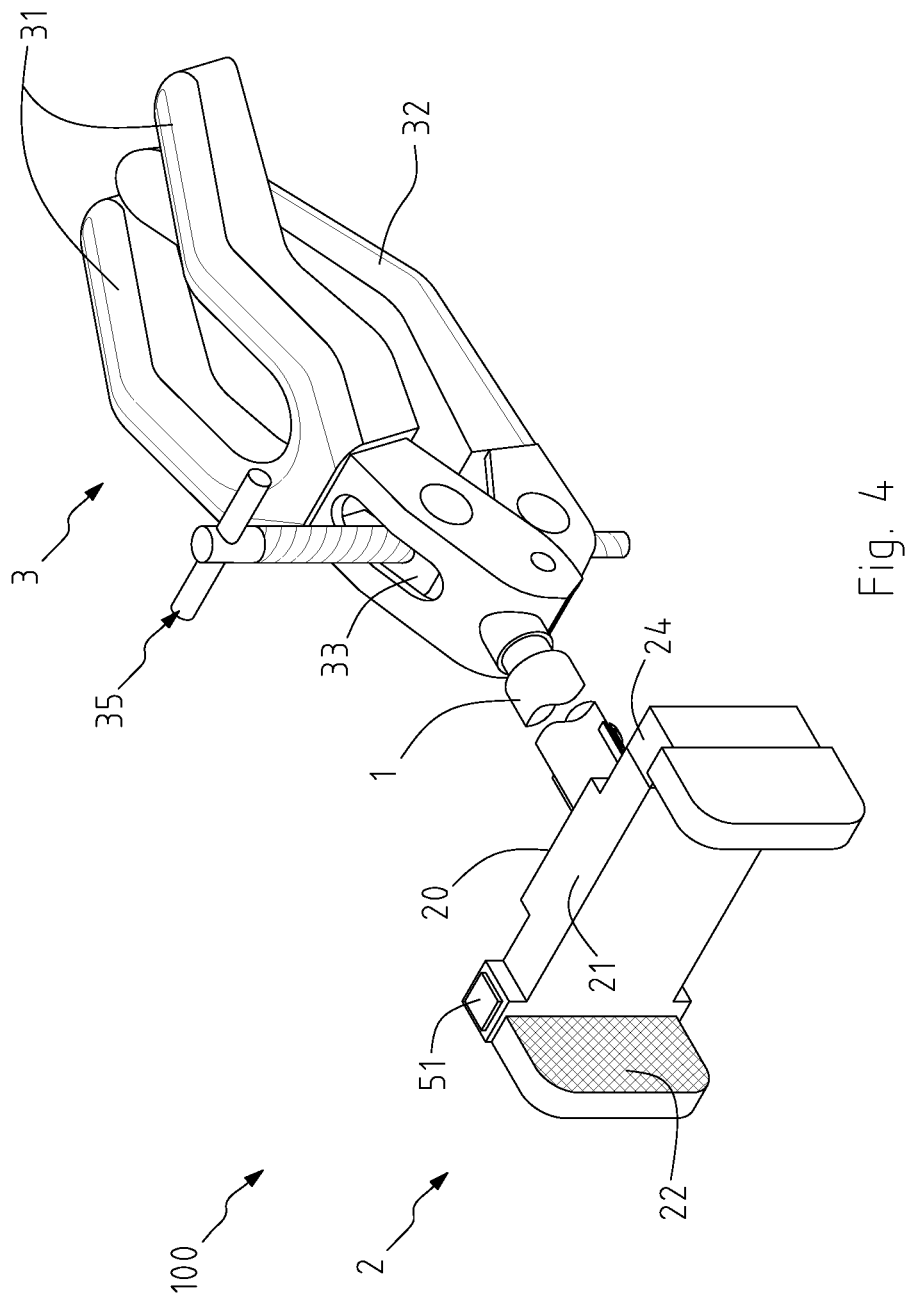
FIG. 4 is a perspective assembly view of an extension rod device of the present invention.
Figure 5:
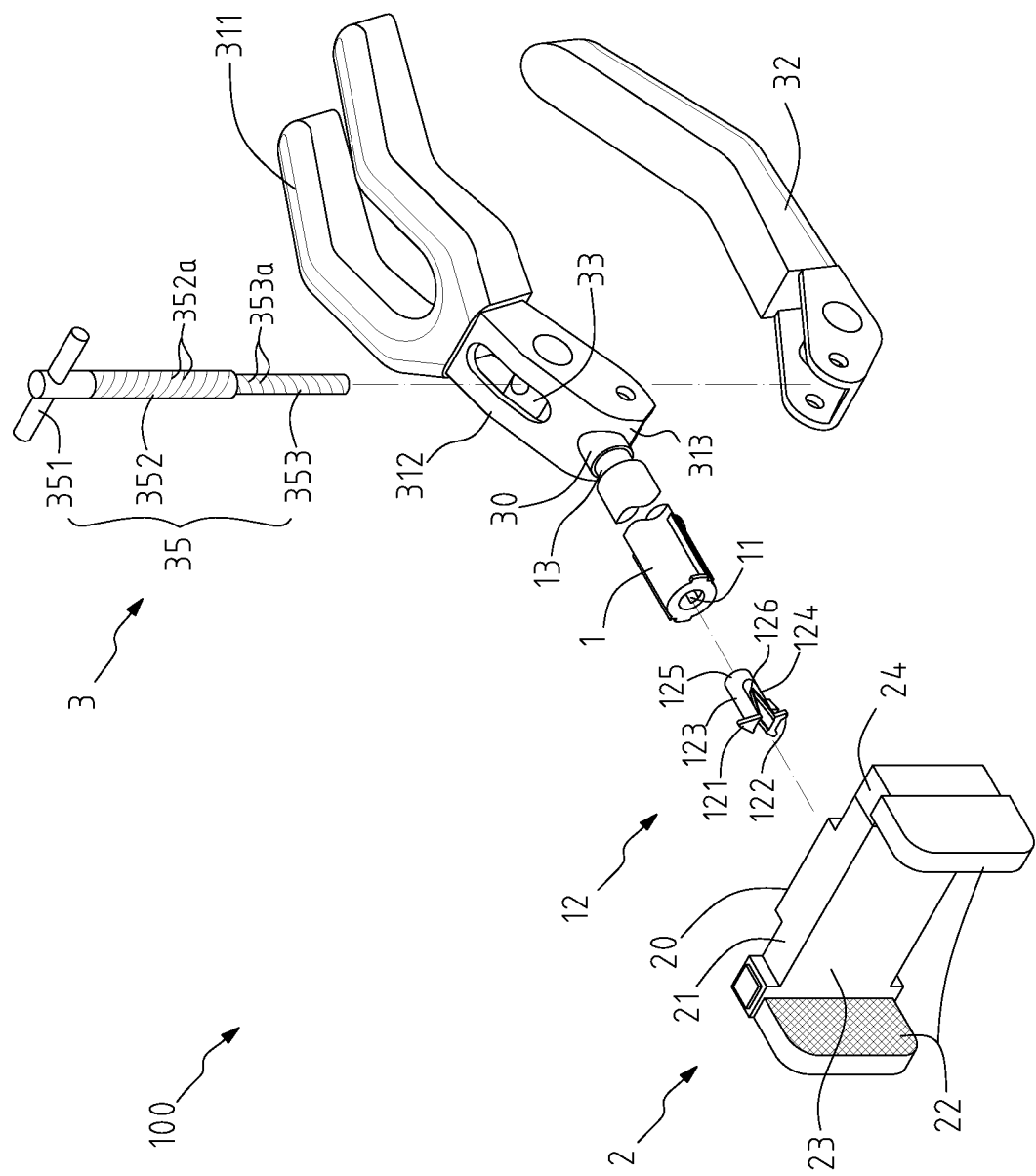
FIG. 5 is a perspective exploded view of FIG. 4.

Referring to FIGS. 4 and 5, the securing member 3 has two upper clamping jaws 31 and a lower clamping jaw 32 that are movable to each other. The lower clamping jaw 32 is symmetrically disposed below the upper clamping jaws 31. Each of the clamping jaws 31 and 32 is provided with a pivot 33 or 34 (as shown in FIG. 1). The pivot 33 or 34 is formed with a threaded hole 331 or 341. The threaded holes 331 and 341 on the pivot 33 and 34 of the clamping jaw 31 or 32 are configured to receive a threaded bolt 35. The threaded bolt 35 serves to adjust an included angle between the clamping jaws 31 and 32 unilaterally, so as to hold or release the external article. The threaded bolt 35 has one end provide with an adjusting lever 351 for a user to operate and thereby drive the threaded bolt 35 to rotate.

Figure 6:
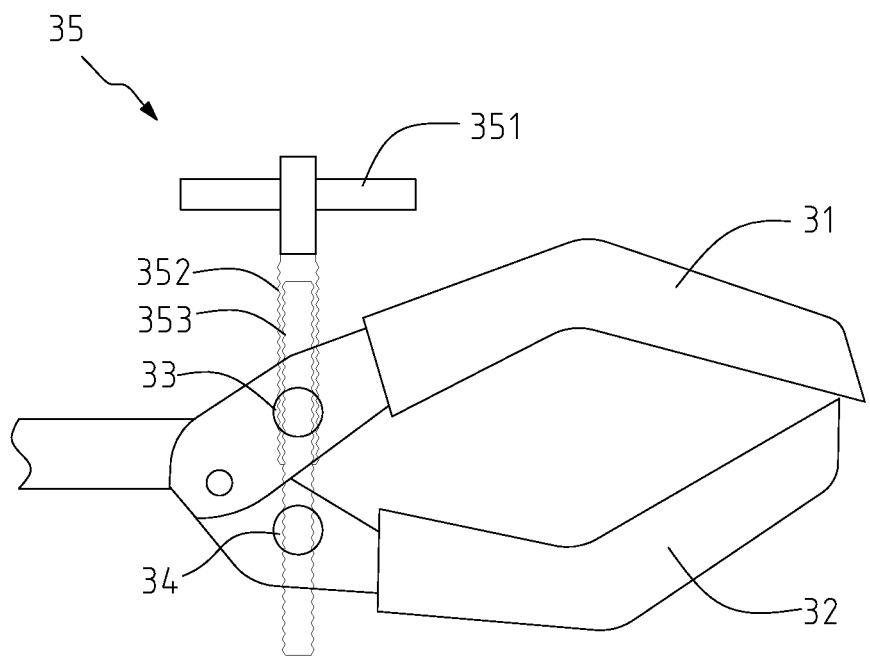
FIG. 6 is a schematic cross-sectional view showing a threaded bolt screwed to clamping jaws of the present invention.

Referring to FIGS. 5 and 6, each of the clamping jaws 31 having a clamping arm 311, a pivoting arm 312, a pivoting end 313 formed at one end of the pivoting arm 312 for being pivoted on the second connecting portion 30, and a pivot 33 formed with a thread hole 331 on the pivoting arm 312, the threaded bolt 35 comprising an outer rod 352 and an inner rod 353 screwed to the outer rod 352. The outer rod 352 has threads spiraling in a direction opposite to that of the inner rod 353. Specifically, the outer rod 352 has right hand threads 352a, and the inner rod 353 has left hand threads 353a. The outer rod 352 and the inner rod 353 respectively screwed to the pivots 33 for adjusting an included angle between the clamping jaws 31 and 32, so as to secure or release the rod body 1 and the positioning frame 2 onto an external article. With the inner rod 353 screwed into the outer rod 352, users can quickly adjust included angles between the clamping jaws 31 and 32 by rotating the adjusting lever 351 at fewer times of rotation. Furthermore, upon rotation of the threaded bolt 35, the inner rod 353 screwed into the outer rod 352 enables a short displacement of the outer rod 252 in the pivot 33 relative to the clamping jaws 31, whereby preventing the threaded bolt 35 from affecting external objects.

Figure 7:
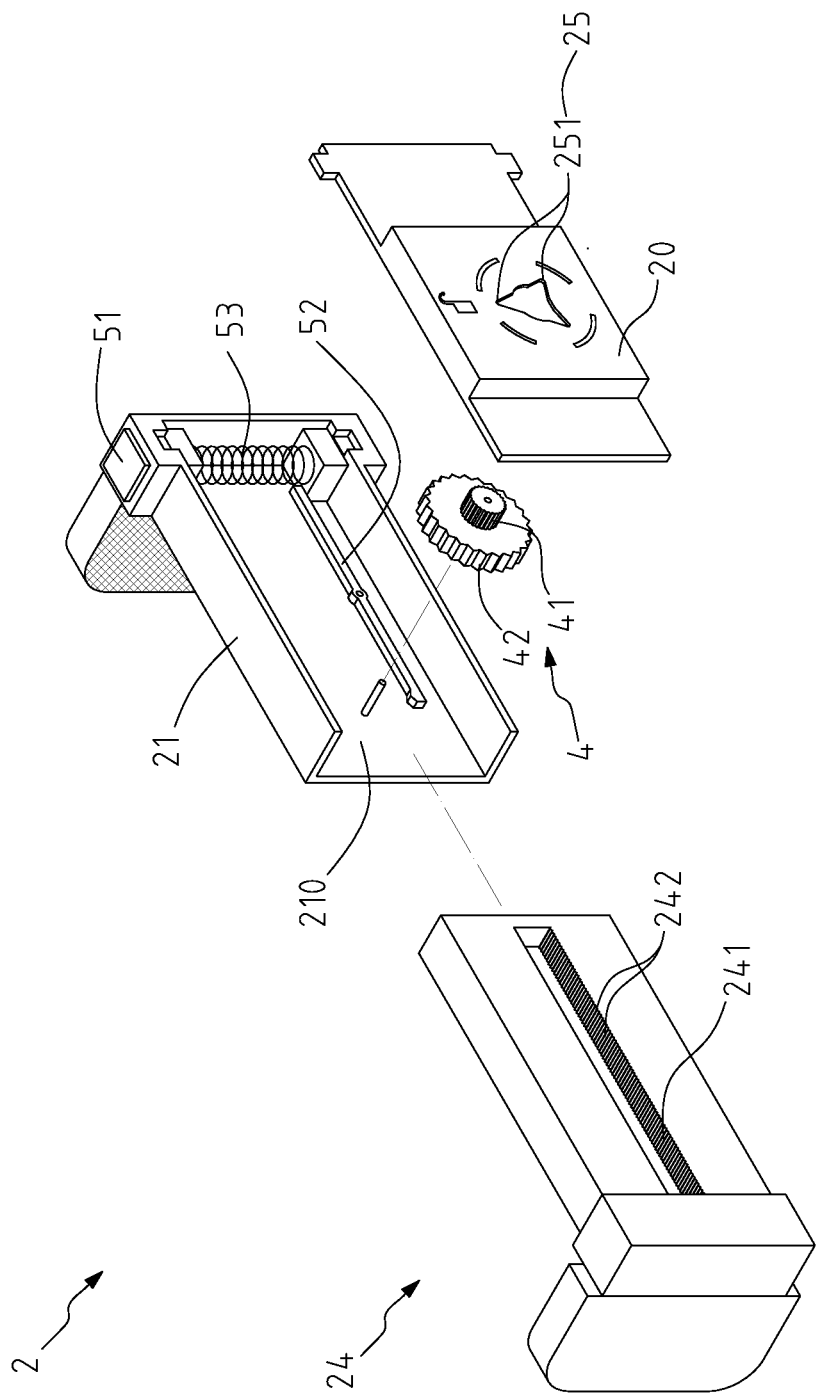
FIG. 7 is a perspective exploded view of a positioning frame of the present invention.
Figure 8:
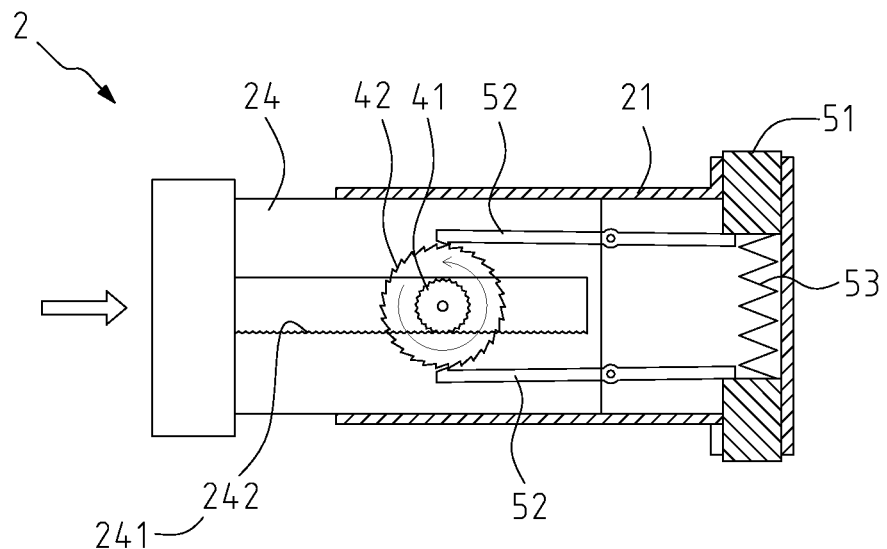
FIG. 8 is a schematic cross-sectional view showing an operation process of the positioning frame.
Figure 9:
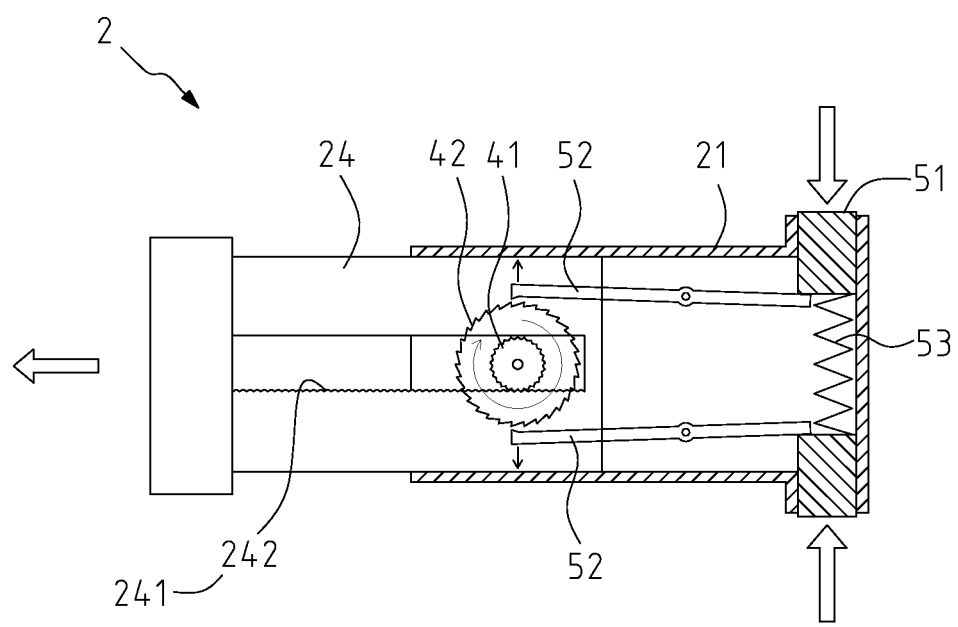
FIG. 9 is another schematic cross-sectional view showing an operation process of the positioning frame.

Referring to FIGS. 7 to 9, the positioning frame 2 comprises a base 21 and an extending board 24, wherein elastic enclosures 22 are respectively formed on end portions of the base 21 and the extending board 24 and extending laterally outward therefrom. The base 21 forms a receiving space 210 therein where a gearing portion 4 is pivotally disposed, and the extending board 24 comprises a track 241 formed on and along the extending board 24. The track 241 has a plurality of tooth portions 242 arranged along the track 241 for being engaged with the gearing portion 4, so that the extending board 24 is engageably movable into and out of the receiving space 210 for holding or releasing the external mobile device 7. The base 21 is further provided with at least a restraining apparatus 5 disposed in the receiving space 210. The restraining apparatus 5 comprises two depressed portions 51 disposed on and exposed to opposite sides of the base 21 for being pressed, two restraining arms 52 spaced apart and extending to the gearing portion 4, and an elastic element 53 connecting the depressed portion 51 and the restraining arm 52. The restraining arms 52 are respectively engageable with opposite sides of the gearing portion 4 and are capable of being disengaged from the gearing portion 4 when the depressed portions 51 are depressed.

Figure 12:
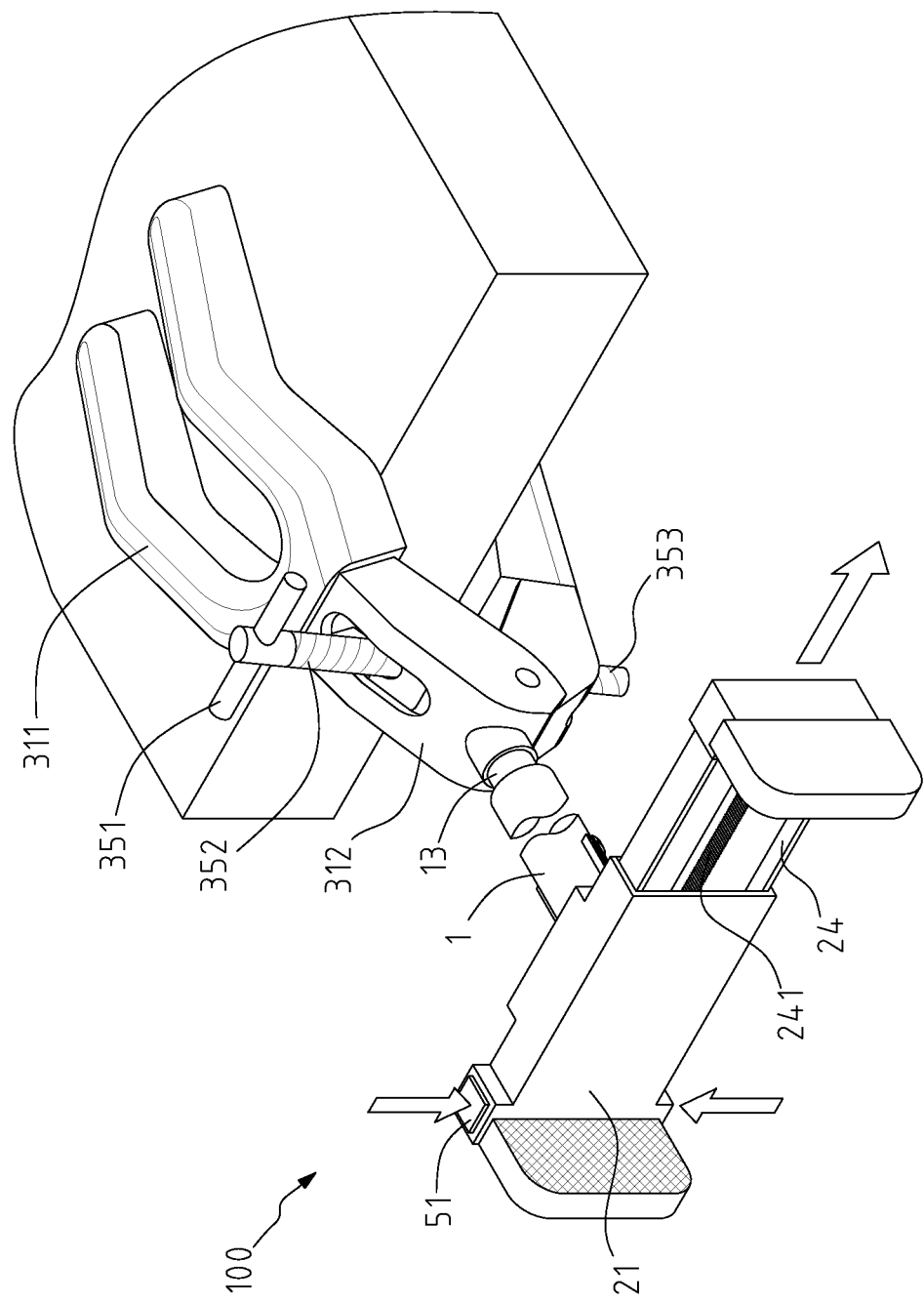
FIG. 12 is a schematic applied view of the present invention where an extending board is being pulled out of a base.
Figure 13:
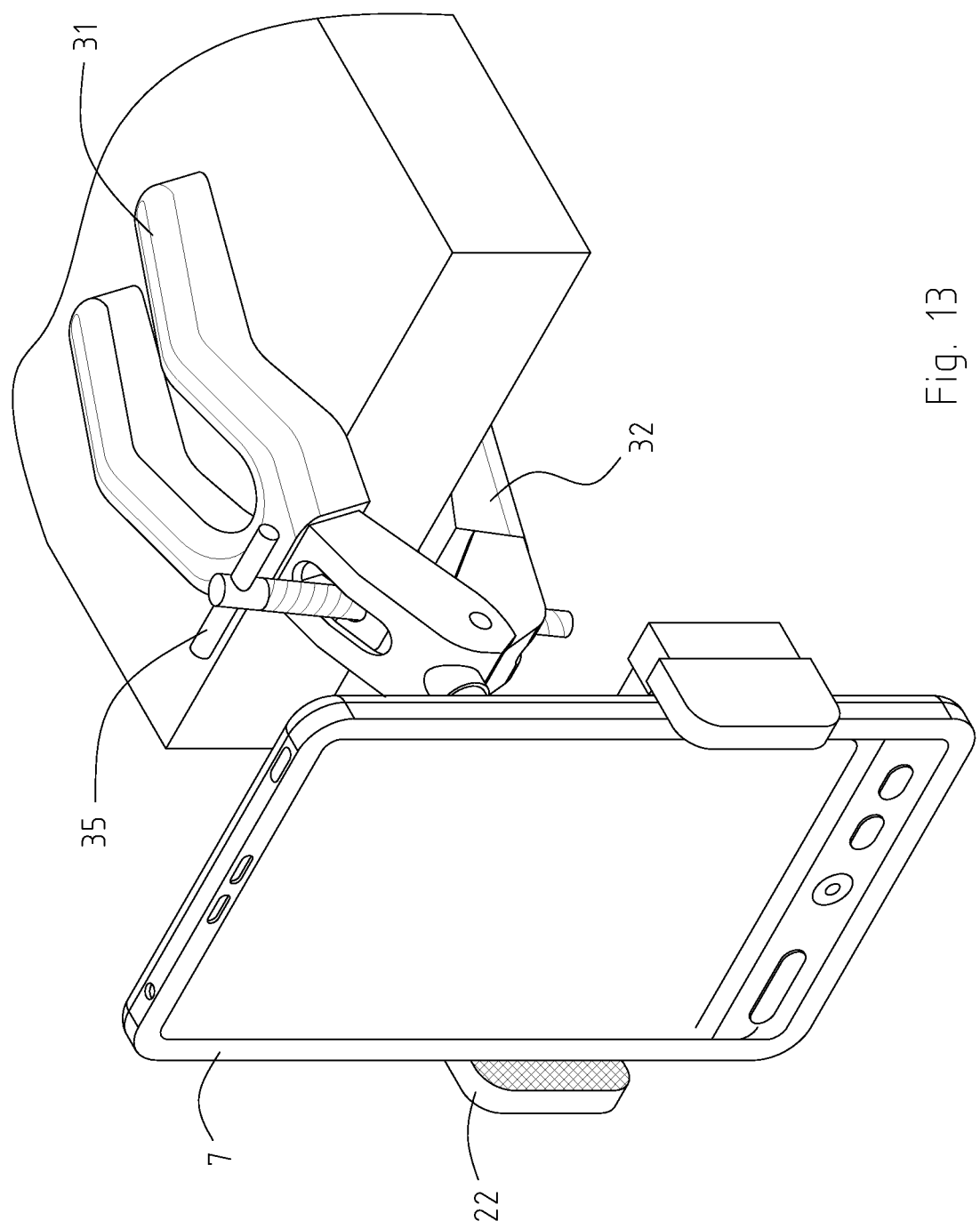
FIG. 13 is a schematic applied view of the present invention showing a mobile phone is clamped by the positioning frame.

As shown in FIG. 5, the gearing portion 4 has an upper gear wheel 41 and a lower gear wheel 42 which is coaxial to the upper gear wheel 41. The upper gear wheel 41 has a diameter smaller than that of the lower gear wheel 42. The upper gear wheel 41 is engageable with the tooth portions 242 of the track 241 of the extending board 24, while the lower gear wheel 42 is engageable with the restraining arms 52. In use, the depressed portions 51 are to be depressed to deform the elastic element 53 so as to bias the restraining arms 52 and release the engagement between the restraining arms 52 and the lower gear wheel 42 (as shown in FIG. 9). As a result, the extending board 24 is allowed to be pulled out of the receiving space 210 to a position where a space between the elastic enclosures 22 is large enough to receive the mobile device 7 (as shown in FIG. 12). Then, the extending board 24 is capable of being pushed back in the receiving space 210, without depressing the depressed portion 51, in order to fittingly securely hold the mobile device 7 (as shown in FIG. 13). When the depressed portions 51 are not being depressed, the restraining arms 52, with barbs formed on free ends thereof, are engaged with the lower gear wheel 42 and therefore restrain the extending board 24 from moving 24 out of the receiving space 210, so as to allow the extending board 24 to be capable of moving only into the receiving space 210 (as shown in FIG. 8).

Figure 10:
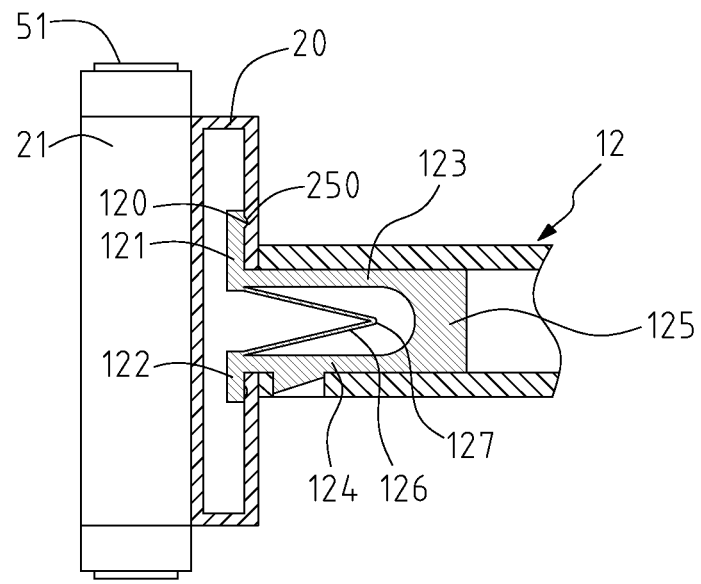
FIG. 10 is a schematic cross-sectional view of a first linking portion connected to the positioning frame.
Figure 11:
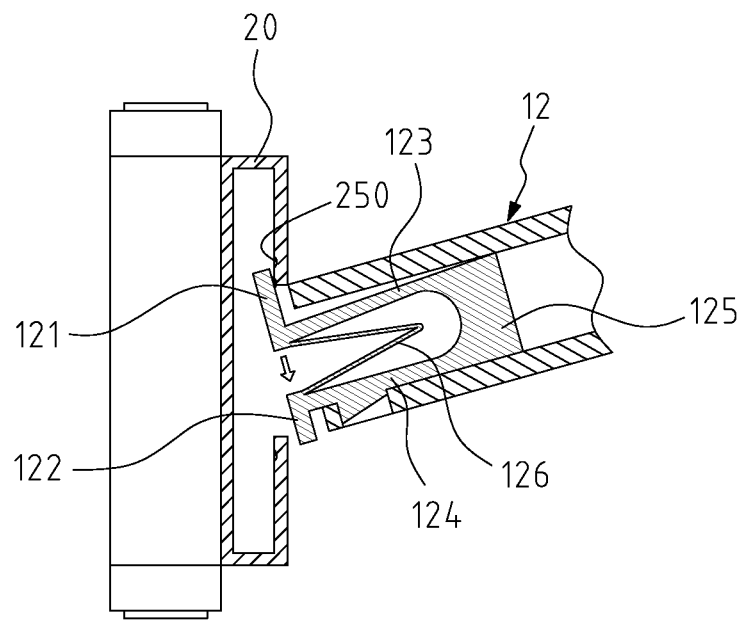
FIG. 11 is a schematic cross-sectional view showing the first linking portion disengaged from the positioning frame.

Referring to FIGS. 10 and 11 in combination with FIGS. 5 and 7, the rod body 1 forms a hollow portion 11 therein which penetrates one end of the rod body 1 for receiving one end of the first linking portion 12. The first connecting portion 20 forms a connecting hole 25 thereon which comprises a plurality of tooth-like grooves 251 radially extending outward from peripheries of the connecting hole 25 (as shown in FIG. 7). The first linking portion 12 is disposed in the hollow portion 11 and comprises a first engaging leg 121 and two second engaging legs 122 respectively extending out of the hollow portion 11 and spaced apart from the rod body 1. The first engaging leg 121 and second engaging legs 122 correspondingly passing through the plurality of tooth-like grooves 251 of the connecting hole 25, so as to connect the rod body 1 and the positioning frame 2 and allow the positioning frame 2 to be rotatable upon the first linking portion 12.

As shown in FIGS. 10 and 11, at least an interference portion 120 is formed on one side of the first engaging leg 121 or one of the second engaging legs 122, while a plurality of embedding portions 250 are formed on an inner wall of the connecting hole 25. The interference portion 120 protrudes from the side of the first engaging leg 121 and is embedded into either one of the embedding portions 250 relative to rotation of the positioning frame 2.

Referring to FIG. 5 in combination with FIGS. 10 and 11, the first linking portion 12 further comprises an upper arm 123, a lower arm 124 and a coupling arm 125 coupling the upper and lower arms 123 and 124. The upper arm 123 forms the first engaging leg 121 at a free end of the upper arm 123 opposite to the coupling arm 125. The lower arm 124 forms the two second engaging legs 122 at a free end of the lower arm 124 opposite to the coupling arm 125. The upper and lower arms 123 and 124 are spaced apart from each other with respect to a vertical middle portion of the coupling arm 125.

Furthermore, a reinforcing element 126 is formed between the upper and lower arms 123 and 124, the reinforcing element 126 comprises two opposite ends respectively connected to the first engaging leg 121 and the second engaging legs 122. The reinforcing element 126 comprises at least a bending portion 127 bending the reinforcing element 126, whereby the reinforcing element 126 has a reversed V shape, but is not limited thereby. The reinforcing element 126 functions to reinforce strength of cantilever structure of the upper and lower arms 123 and 124 when the upper and lower arms 123 and 124 are being depressed. Moreover, because the upper and lower arms 123 and 124 are connected to and restrained by the reinforcing element 126, the reinforcing element 126 can prevent the upper and lower arms 123 and 124 from causing material fatigue after repeatedly deformation, and further improve flexibility of the upper and lower arms 123 and 124.

Thereby, the extension rod device 100 is highly portable and can be quickly and conveniently attached to a horizontal or a vertical handrail 81 by means of the securing member 3. In virtue of the positioning frame 2, the whole assembly frees the user's hand from holding the mobile device 7.

It is to be noted that the rod body 1 is such designed that when the positioning frame 2 and the securing member 3 are detached from the first linking portion 12 and the second linking portion 13 at the two ends of the rod body 1, respectively, the rod body 1 is capable of being used independently as a portable tool, sic as a crutch, a walking stick, a fishing pole, a pen, a microphone stand or a music stand. When the rod body 1 is formed with an umbrella frame that is covered by a piece of umbrella cloth 6, it can be use as an umbrella or a parasol.

Accordingly, the extension rod device 100 can be rapidly secured to or detached from any nearby handrail 81 or boardlike object by means of the securing member 3. In virtue of the positioning frame 2 that holds and positions the mobile device 7, the whole assembly is helpful to prevent users' muscle fatigue and ache caused by overuse of neck and shoulder muscles. In addition, the positioning frame 2 and the securing member 3 at the two ends of the rod body 1 can be easily detached, so that the extension rod device 100 is capable being independently used as a portable personal article, such as an umbrella, a crutch, a walking stick, a cane, a fishing pole, a pen, a microphone stand or a music stand, as designed.

It is understood that the invention may be embodied in other forms within the scope of the claims. Thus the present examples and embodiments are to be considered in all respects as illustrative, and not restrictive, of the invention defined by the claims.

What is claimed is:

1. An extension rod device working with a fixer for handheld, portable, mobile devices, the extension rod device comprising:

a rod body having two ends that are respectively detachably attached with a positioning frame and a securing member, the positioning frame serving to hold and position an external mobile device;

a first connecting portion formed on the positioning frame for engaging a first linking portion, one end of the first linking portion connected to one end of the rod body; and a second connecting portion connected with the securing member for engaging a second linking portion that is connected to another end of the rod body;

wherein the securing member comprises at least two movable clamping jaws and a threaded bolt, each of the clamping jaws having a clamping arm, a pivoting arm, a pivoting end formed at one end of the pivoting arm for being pivoted on the second connecting portion, and a pivot formed with a thread hole on the pivoting arm, the threaded bolt comprising an outer rod and an inner rod screwed to the outer rod, the outer rod having threads spiraling in a direction opposite to that of the inner rod, the outer rod and the inner rod respectively screwed to the pivots of the pivoting arms for adjusting an included angle between the clamping jaws, so as to secure or release the rod body and the positioning frame onto an external article.

2. The extension rod device of claim 1, wherein the positioning frame comprises abase and an extending board, the base forms a receiving space therein where a gearing portion is disposed therein, and the extending board comprises a track formed on and along the extending board, the track having a plurality of tooth portions for being engaged with the gearing portion, so that the extending board is engageably movable into and out of the receiving space for holding or releasing the external mobile device.

3. The extension rod device of claim 2, wherein the base further comprises at least a restraining apparatus disposed in the receiving space, the restraining apparatus comprising at least a depressed portion exposed to the base for being pressed, at least a restraining arm, and an elastic element connecting the depressed portion and the restraining arm, the restraining arm being engageable with the gearing portion and capable of being disengaged from the gearing portion by depressing the depressed portion.

4. The extension rod device of claim 3, wherein the gearing portion has an upper gear wheel and a lower gear wheel, the upper gear wheel is engageable with the tooth portions of the track of the extending board, the lower gear wheel is engageable with the restraining arm, where the restraining arm is capable of restraining the movement of the extending board when the depressed portion is not being depressed so as to allow the extending board to only move into the receiving space.

5. The extension rod device of claim 1, wherein the rod body forms a hollow portion therein which penetrates one end of the rod body for receiving one end of the first linking portion, the first connecting portion forms a connecting hole thereon which comprises a plurality of tooth-like grooves radially extending outward from peripheries of the connecting hole, the first linking portion disposed in the hollow portion and comprising at least a first engaging leg and at least a second engaging leg respectively extending out of the hollow portion and spaced apart from the rod body, the at least a first engaging leg and a second engaging leg correspondingly passing through the plurality of tooth-like grooves of the connecting hole, so as to connect the rod body and the positioning frame and allow the positioning frame to be rotatable upon the first linking portion.

6. The extension rod device of claim 5, wherein an interference portion is formed on one side of the first engaging leg or the second engaging leg, a plurality of embedding portions are formed on an inner wall of the connecting hole, and the interference portion is embedded into either one of the embedding portions relative to rotation of the positioning frame.

7. The extension rod device of claim 5, wherein the first linking portion further comprises an upper arm, a lower arm and a coupling arm coupling the upper and lower arms, the upper arm forming the at least a first engaging leg at a free end of the upper arm opposite to the coupling arm, the lower arm forming the at least a second engaging leg at a free end of the lower arm opposite to the coupling arm, and the upper and lower arms being spaced apart from each other with respect to a vertical middle portion of the coupling arm.

8. The extension rod device of claim 7, wherein a reinforcing element is formed between the upper and lower arms, the reinforcing element comprising two opposite ends respectively connected to the at least a first engaging leg and the at least a second engaging leg, and the reinforcing element comprising at least a bending portion bending the reinforcing element.

9. The extension rod device of claim 1, wherein the outer rod has right hand threads, and the inner rod has left hand threads.

* * * * *